D. W. STROUP.
METHOD FOR FORMING HOLLOW AXLES.
APPLICATION FILED OCT. 8, 1906.

1,007,815.

Patented Nov. 7, 1911.

6 SHEETS—SHEET 1.

D. W. STROUP.
METHOD FOR FORMING HOLLOW AXLES.
APPLICATION FILED OCT. 8, 1906.
1,007,815.
Patented Nov. 7, 1911.
6 SHEETS—SHEET 2.
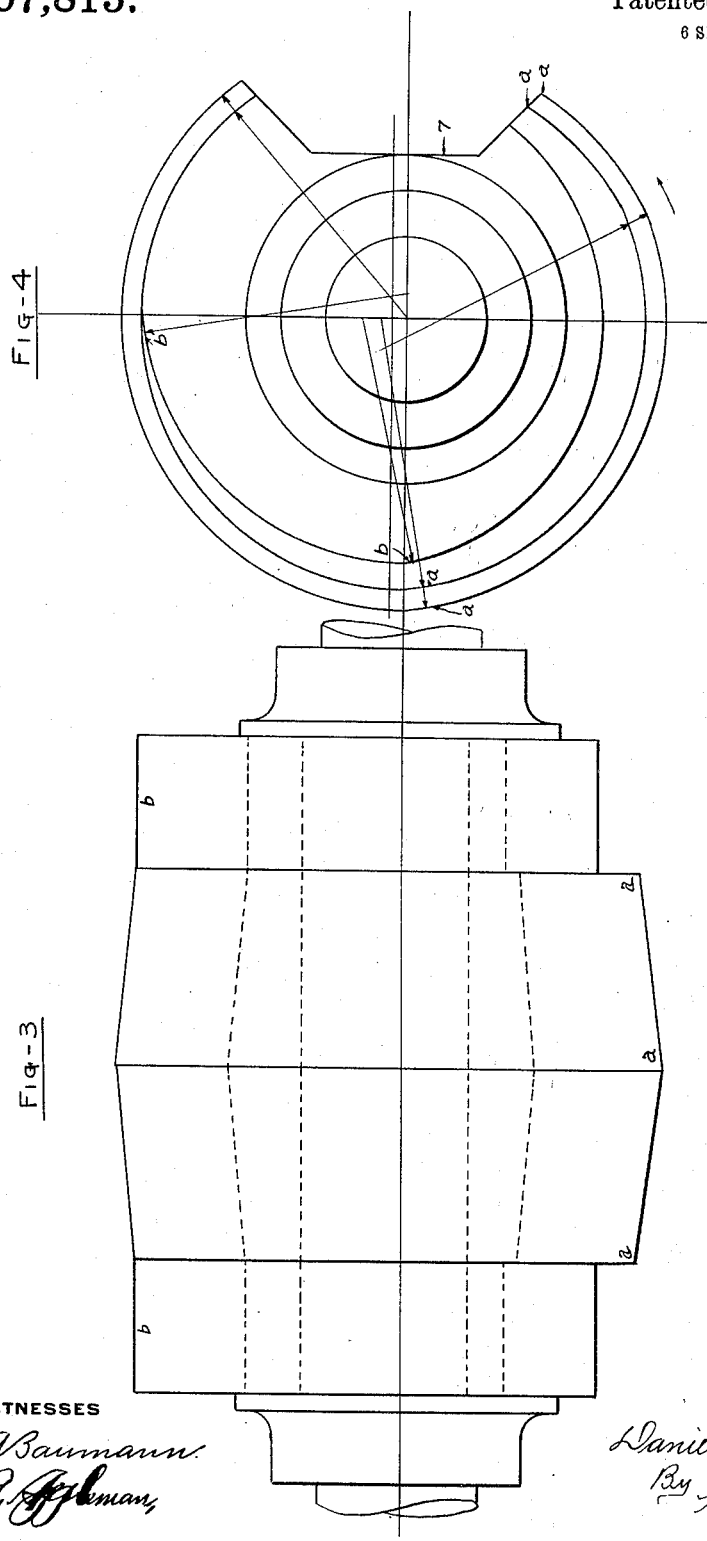
WITNESSES
INVENTOR D. W. STROUP.
METHOD FOR FORMING HOLLOW AXLES.
APPLICATION FILED OCT. 8, 1906.
1,007,815.
Patented Nov. 7, 1911.
6 SHEETS—SHEET 3.
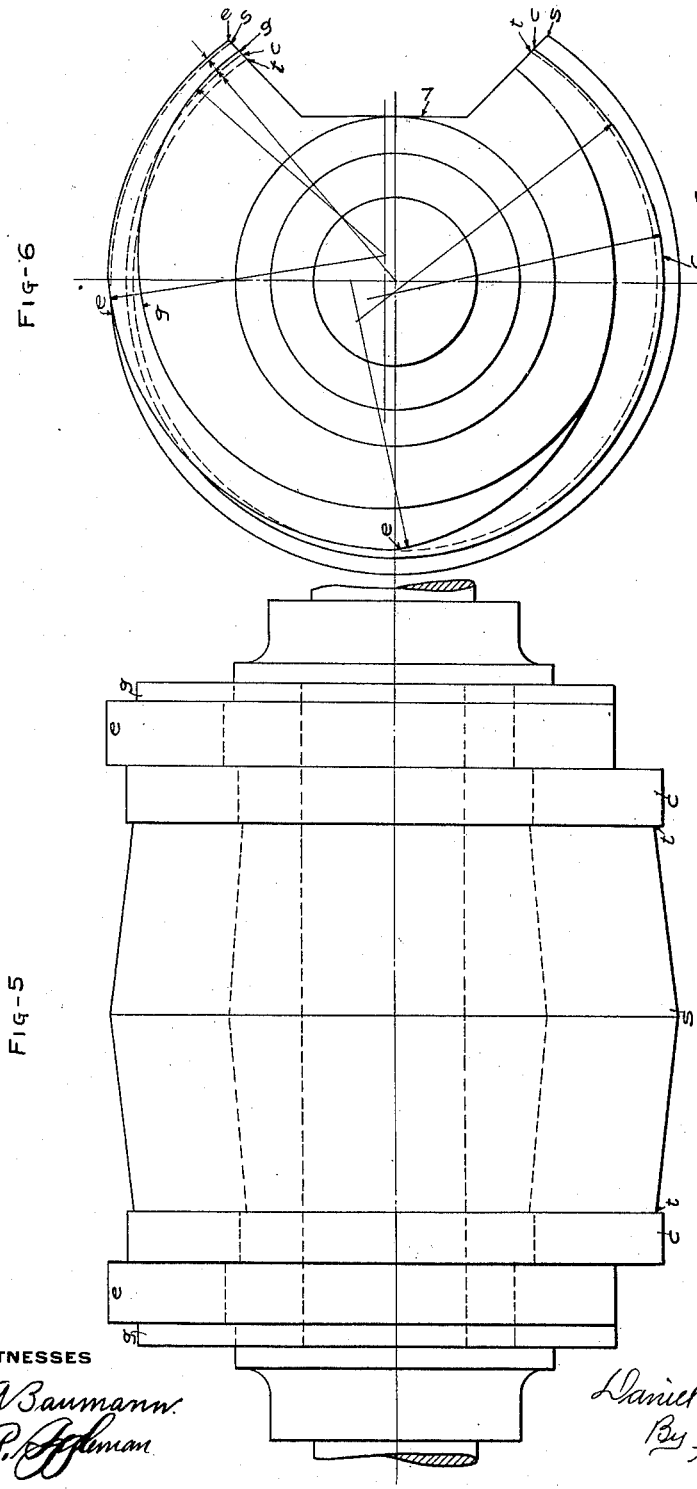
WITNESSES
INVENTOR

D. W. STROUP.
METHOD FOR FORMING HOLLOW AXLES.
APPLICATION FILED OCT. 8, 1906.

1,007,815.

Patented Nov. 7, 1911.
6 SHEETS—SHEET 4.

D. W. STROUP.
METHOD FOR FORMING HOLLOW AXLES.
APPLICATION FILED OCT. 8, 1906.
1,007,815.
Patented Nov. 7, 1911.
6 SHEETS—SHEET 5.
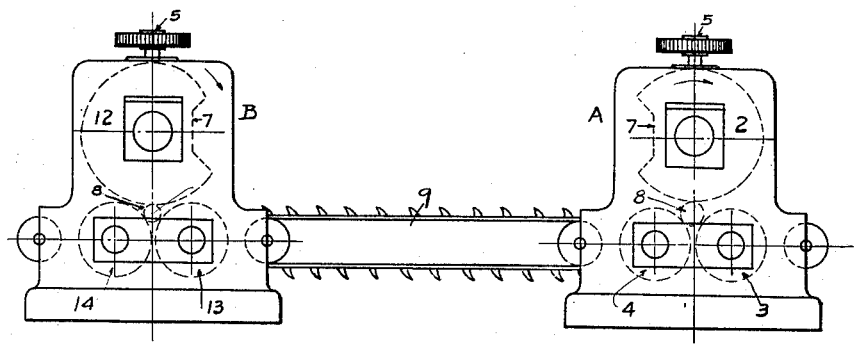
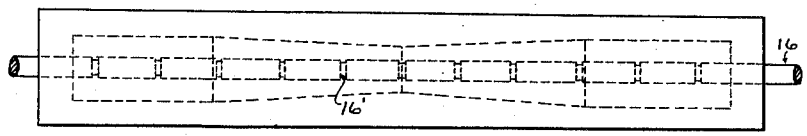
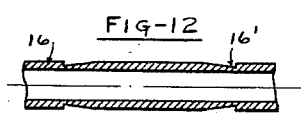
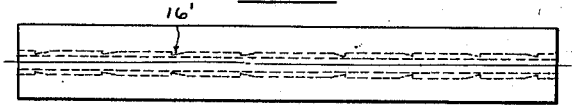
WITNESSES
INVENTOR
Daniel W. Stroup
By H. W. Stevenson
Attorney

D. W. STROUP.
METHOD FOR FORMING HOLLOW AXLES.
APPLICATION FILED OCT. 8, 1906.

1,007,815.

Patented Nov. 7, 1911.
6 SHEETS—SHEET 6.

WITNESSES
C. A. Baumann
J. P. Appleman

INVENTOR
Daniel W. Stroup
By H. W. Stevenson
Attorney

COLUMBIA PLANOGRAPH CO., WASHINGTON, D. C.

UNITED STATES PATENT OFFICE.

DANIEL W. STROUP, OF BRADDOCK, PENNSYLVANIA.

METHOD FOR FORMING HOLLOW AXLES.

1,007,815.  Specification of Letters Patent.  Patented Nov. 7, 1911.

Application filed October 8, 1906. Serial No. 337,920.

*To all whom it may concern:*

Be it known that I, DANIEL W. STROUP, a citizen of the United States, residing at Braddock, in the county of Allegheny and State of Pennsylvania, have invented a new and useful Improvement in Methods for Forming Hollow Axles, of which improvement the following is a specification.

My invention relates to the method for forming hollow axles, or other similarly formed articles.

The primary object of my invention is to produce a hollow axle from a hollow cast ingot, and I accomplish this object by the method hereinafter specifically described, in conjunction with an apparatus shown in the accompanying drawings.

The method or process involved in my invention consists in first forming a hollow ingot or metal blank by pouring or casting the metal around a core, next inserting a preferably tapered mandrel in the orifice thus formed, then, by subjecting the blank to rotary or other compression, reducing said blank, first at its center, then later at its ends, thus elongating the same preparatory to the final or finishing operation. The second step in the process involves subjecting the partly prepared blank to additional compression, either rotary or otherwise, further elongating said blank, and forming the requisite bearings and collars at each end of the finished axle.

Figure 1:
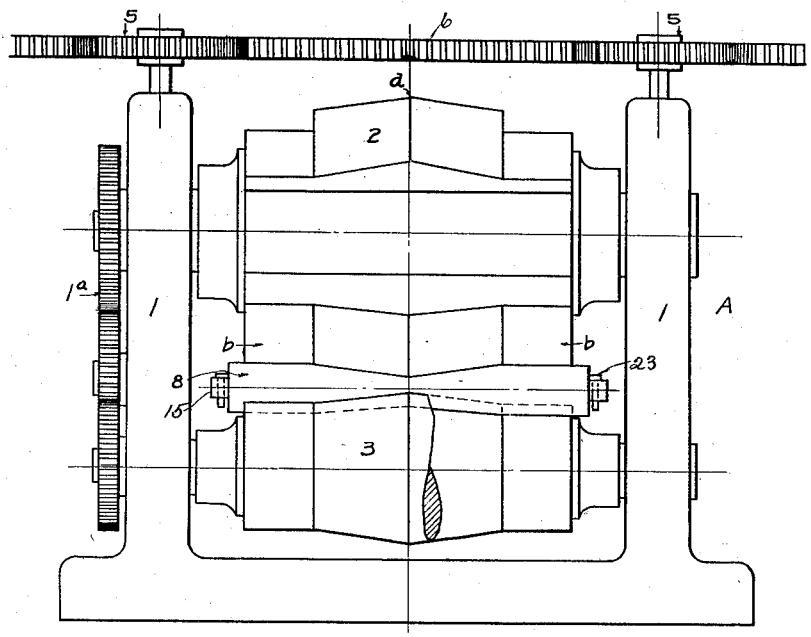
Figure 2:
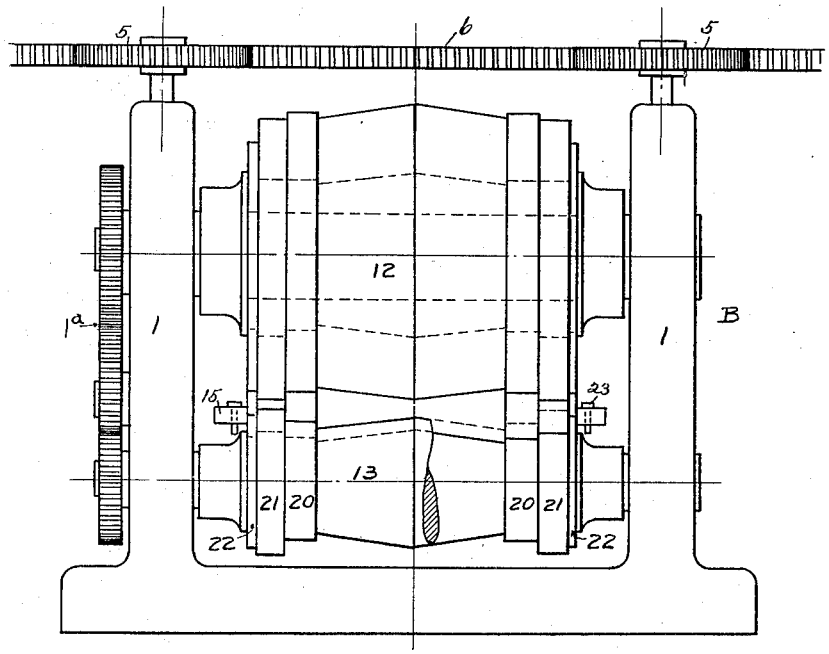
Figure 7:
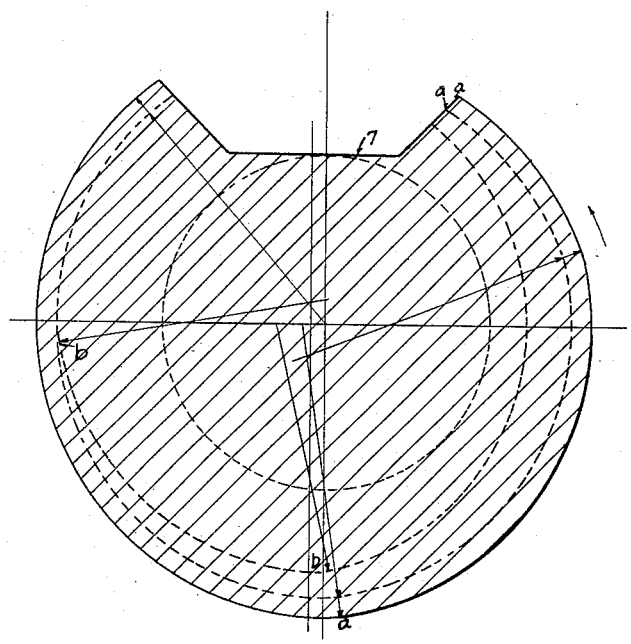
Figure 8:
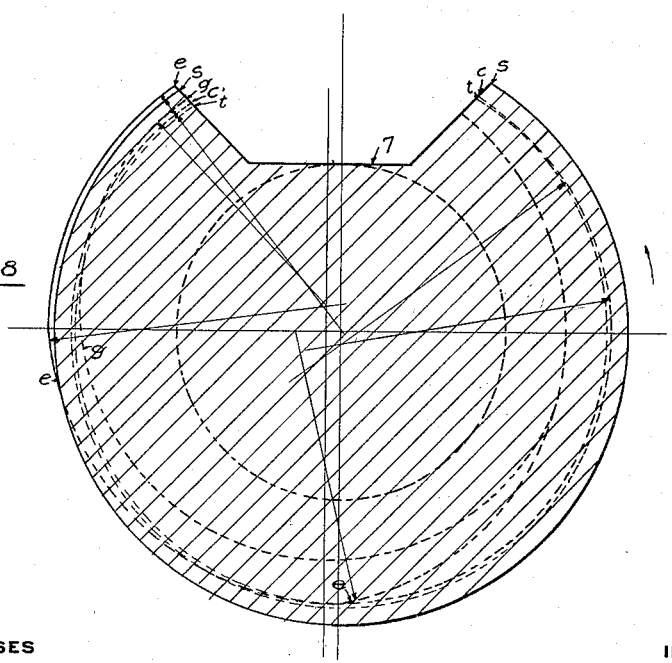
Figure 14:
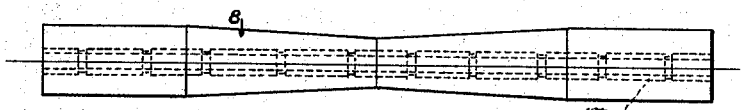
Figure 15:
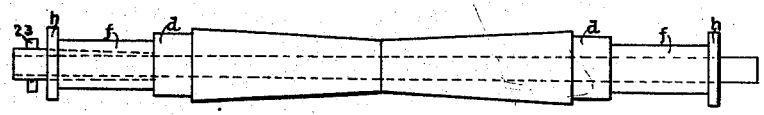
Figure 16:
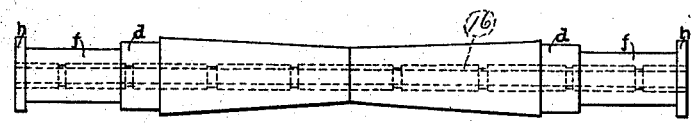
Figure 17:
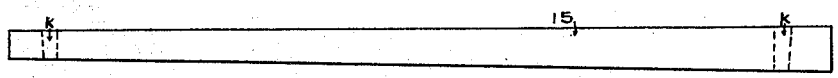
Figure 18:
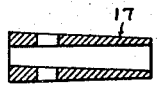

In carrying out my method I preferably use the rotary apparatus illustrated in the accompanying drawings, in which:

Figure 1 is a longitudinal side elevation of the roughing rolls; Fig. 2 is a similar view of the finishing rolls; Fig. 3 is a side elevation of the roughing roll; Fig. 4 is an end view of the roughing roll showing different radii and the position of their respective centers; Fig. 5 is a side elevation of the finishing roll; Fig. 6 is an end view of said finishing roll showing the different radii and their respective centers; Fig. 7 is a transverse sectional view taken through the middle of the roughing roll showing the different radii and position of their respective centers; Fig. 8 is a similar view taken through the finishing roll; Fig. 9 is an end view of the two mills showing the same tandem, with a conveyer interposed between; Fig. 10 is an axle blank mold involving a solid core; Fig. 11 shows a grooved segment of pipe, and Fig. 12 a modified or notched segment of pipe; Fig. 13 is a straight axle blank involving a notched pipe; Fig. 14 is a rough hollow axle blank involving a grooved pipe; Fig. 15 is a finished hollow axle having a mandrel inserted therein; Fig. 16 shows a finished axle with a grooved pipe therein; Fig. 17 is a tapered mandrel having apertures at each end; and Fig. 18 shows a mandrel sleeve with aperture.

Referring to the drawings, in which the same reference numerals and letters designate like parts throughout the different views, 1—1 are suitable housings in which the rolls are mounted. The roughing mill involves the rolls 2, 3, and 4, which are properly mounted and operatively connected by adequate gearing $1^a$, the upper or working roll 2 being approximately twice or more the diameter of each of the lower rolls 3 and 4 respectively. Said roll 2 is formed with a centrally disposed eccentric portion $a$, the greatest diameter occurring at the longitudinal center of the roll, and gradually tapering therefrom toward each end; as shown. Said roll is also provided with eccentrics $b$—$b$, one at each end, the eccentricity occurring on the opposite side of the roll to the eccentrics $a$—$a$. The eccentric portion $a$ is for the purpose of reducing the blank 8 at its center, and elongating the same toward the ends, the greatest reducing occurring at the center of the blank, and gradually lessening to a fixed point adjacent each end. The eccentrics $b$—$b$ at the ends of the roll act upon the blank after the central eccentric portion $a$ ceases to act, and are for the purpose of further elongation of the said blank, and reduction of said ends, preparatory to being passed through the finishing rolls. The lower rolls 3 and 4 are identical in size and configuration, and are geared to the upper roll 2 in such a manner that their paths of revolution will be in the same direction as the path of the said upper roll. The blank 8 when inserted between the upper and lower rolls will act as an idler, and be rotated in the same direction as said upper roll while under the process of shaping and compression.

The finishing rolls B comprise the upper or finishing roll 12, and lower rolls 13 and 14, which are mounted in housings, and geared similar to those in the roughing rolls A, said upper roll 12 being approximately twice or more the diameter of the lower rolls 13 and 14. The said roll 12 is tapered from its longitudinal center toward the ends, to conform to the central contour of the axle blank, the greatest diameter occurring at the said center, and is provided near each end with eccentrics c—c, adapted to form wheel bearings d on the finished axle, also with eccentrics e—e, on the opposite side of the roll 12 from the eccentrics c—c, to form the journal bearings f—f, and immediately following the said roll is provided with eccentrics g—g to form the collars h—h on the finished axle. On the finishing roll 12 the middle tapered portion, which is not a working part, but simply acts to hold the blank in position while being worked upon and further elongated by the eccentric working parts, is represented by s—s, and t—t designates the ends of said middle portion. The configuration of the two lower rolls is similar to the upper roll, without the eccentric features, but including the collars 20 to assist in forming the wheel bearings d; collars 21 to assist in forming the journal bearings f; and with collars 22 to assist in forming the collars h on the finished axle.

Prior to the blank being passed into the rolls A and B a tapered mandrel 15 is inserted through the orifice formed in said blank, and is secured therein during the rolling process by means of a pin or pins 23, which are inserted in the apertures k formed in each end of said mandrel. In order that the tapered mandrel may find a firm seat in the orifice formed in the blank I provide the sleeve 17 which is adapted to enter said orifice and seat over the smaller end of the mandrel. An aperture formed in said sleeve is adapted to register with the aperture k in the mandrel for the reception of said pin, or similar member.

In Fig. 10 I show a mold for forming the hollow blank 8 shown in Fig. 14. In molding the blank into this form it will be considerably shorter than the finished article, and somewhat greater in cross section, so that when a mandrel is inserted through the orifice formed by the core 16, and the blank, with the mandrel, placed in the rolls A, it will be elongated and reduced from the center outward to the ends as heretofore described. This elongation and reduction serves to solidify the material, greatly increasing the tensile strength thereof.

In molding the blank into either of the forms shown in Figs. 13 and 14 I preferably use as a core the metallic pipe or tube 16, around which the metal is poured, suitable notches or grooves 16' being provided in the periphery of said pipe or tube in order that there will be a positive amalgamation or interlocking between the said inner tube and poured metal, thus preventing said tube from becoming disengaged or from working loose during the subsequent steps in the process of formation, or when the axle is being utilized in its finished state. The said rolls 2 and 12 are each provided with a recess 7 longitudinally thereof, at a point in the surface between the eccentric portions, for the purpose of permitting the blank to be easily entered in the rolls, or discharged upon the conveyer 9, and carried thereby from the rolls A to the rolls B. Both of said upper rolls are preferably made adjustable in their housings, and capable of being raised or lowered by means of the screws 5—5, which may be operated simultaneously by means of the rack 6, or other suitable means well known to the art.

It is optional whether the orifice in the blank is straight or tapered, but for all practical purposes I prefer to use a tapered mandrel during the process of compression and formation of the axle, in order to readily remove said mandrel from the orifice upon final completion of the axle.

What I claim as new is:

1. In the forming of hollow articles the method comprising the taking of a hollow longitudinally apertured metal part and casting a metal part around and upon the first part, then by compression reducing and elongating the blank thus formed.

2. In the forming of hollow articles the method comprising the taking of a hollow longitudinally apertured metal part and casting a metal part around and upon the first part, the parts above referred to being so constructed that projecting portions on one part enter recessed portions on the other part, and then by compression reducing and elongating the blank thus formed.

3. The herein described method or process of shaping hollow metallic ingots or blanks to produce hollow axles, which consists in pouring or casting the metal around a core, inserting a mandrel in the orifice in the blank, then by compression reducing said blank at its center, elongating and tapering the same toward the ends, reducing said ends, and finally by compression further elongating the blank, forming the wheel bearings, journal bearings, and collars.

In testimony whereof, I have hereunto signed my name in the presence of two subscribing witnesses.

DANIEL W. STROUP.

In the presence of—
CLARENCE A. WILLIAMS,
JOHN H. RONEY.